(12) United States Patent
Juul et al.

(10) Patent No.: US 6,595,314 B2
(45) Date of Patent: Jul. 22, 2003

(54) HYDRAULIC STEERING SYSTEM, FOR AN ARTICULATED VEHICLE WITH WHEEL STEERING

(75) Inventors: Torben Juul, Sønderborg (DK); Tom Rudolph, Ames, IA (US); Jørgen Clausen, Sønderborg (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 69 days.

(21) Appl. No.: 10/033,641

(22) Filed: Dec. 26, 2001

(65) Prior Publication Data

US 2002/0088664 A1 Jul. 11, 2002

(30) Foreign Application Priority Data

Dec. 28, 2000 (DE) .......................................... 100 65 557

(51) Int. Cl.[7] ................................................. B62D 5/32
(52) U.S. Cl. ..................... 180/419; 180/406; 180/442
(58) Field of Search ................................. 180/405, 406, 180/417–419, 424, 442

(56) References Cited

U.S. PATENT DOCUMENTS

| 3,964,566 | A | * | 6/1976 | Smith et al. | 180/406 |
|---|---|---|---|---|---|
| 4,015,681 | A | * | 4/1977 | Shore et al. | 180/406 |
| 4,410,057 | A | * | 10/1983 | Johnson | 180/406 |
| 4,565,257 | A | | 1/1986 | Hanson | |
| 4,802,545 | A | | 2/1989 | Nystuen et al. | |

FOREIGN PATENT DOCUMENTS

DE          3543054          6/1986

* cited by examiner

*Primary Examiner*—Lesley D. Morris
*Assistant Examiner*—Matthew Luby

(57) ABSTRACT

A hydraulic steering system (1) for a vehicle with two steering motor arrangements, particularly an articulated vehicle with wheel steering, with a hydraulic steering unit (2) having a measuring motor section (22, 23), with a selection valve (6), which connects an outlet (L, R) of the steering unit (2) with either a first steering motor arrangement (7) that preferably acts upon steered wheels, or a second steering motor arrangement (9) that preferably acts upon a converting kit, and which is hydraulically operable via a pilot valve (14), and with a pump (4), which is connected with the steering unit (2) and the pilot valve (14). This permits the vehicle to be steerable in connection with an emergency.

6 Claims, 1 Drawing Sheet

HYDRAULIC STEERING SYSTEM, FOR AN ARTICULATED VEHICLE WITH WHEEL STEERING

FIELD OF THE INVENTION

The invention concerns a hydraulic steering system for a vehicle with two steering motor arrangements, particularly an articulated vehicle with wheel steering, with a hydraulic steering unit having a measuring motor section, with a selection valve, which connects an outlet of the steering unit with either a first steering motor arrangement or a second steering motor arrangement and which is hydraulically operable via a pilot valve, and with a pump, which is connected with the steering unit and the pilot valve.

BACKGROUND OF THE INVENTION

A conventional steering system is shown in U.S. Pat. No. 4,802,545. Such steering systems are used for tractors, building site vehicles or other working machines, for which a very small steering radius is desired. A vehicle of this kind has two frame parts, which are connected with each other via a converting kit. When, via the second steering motor arrangement, the two vehicle parts are brought to an angle position in relation to each other, the vehicle will drive in a curve. When, additionally, it is ensured that at least one wheel pair can be turned in relation to the vehicle part, on which it is arranged, the curve described by the vehicle will be even narrower. The switching between the two steering motors is made by means of a selection valve, which lets the steering unit act upon either the first steering motor arrangement and thus upon the steered wheels, or the second steering motor arrangement and thus upon the converting kit. This selection valve is hydraulically operated, the pressure required for the operation being controlled by a pilot valve.

Considering the tough working condition to which such working machines are exposed, failure situations cannot always be avoided with the required reliability. Thus, in certain cases, it may happen that for some reason the pump pressure fails. When, in such a situation, the vehicle is articulated, it can practically no longer be steered. The measuring motor section of the steering unit can be used as auxiliary pump, to operate one of the steering motor arrangements. As, however, due to the missing switching ability of the selection valve the other steering motor arrangement can no longer be operated, the vehicle on a whole can practically no longer be steered. This is particularly critical, when the vehicle can no longer be straightened from its articulated position, as then, under certain circumstances, a towing is also no longer possible.

Therefore, the principal object of this invention is to permit steering of the vehicle in the case of an emergency.

SUMMARY OF THE INVENTION

The steering system of this invention has an operating inlet of the pilot valve connected with an outlet of a change-over valve, whose first inlet is connected with the pump and whose second inlet is connected with the outlet of the steering unit.

This embodiment solves the task of permitting steering of the vehicle in case of an emergency with relatively little effort. It must merely be ensured that in the case of failure of the pump pressure, the operating inlet of the pilot valve can be supplied with the pressure from the steering unit. This is the purpose of the change-over valve. Basically, therefore, this change-over valve and an additional line are required to make the selection valve operable by means of the pilot valve. When the selection valve is operable, the driver can operate both steering motor arrangements and bring the vehicle into a state, in which it can be steered more easily. A preferred application for the invention is vehicles in which the first steering motor arrangement acts upon steered wheels and the second steering motor arrangement acts upon a converting kit.

The change-over valve is made as a two-way valve. The two-way valve passes the higher of the pressures on its two inlets on to its outlet. During normal operation, the higher pressure is the pump pressure, so that in the undisturbed case the pilot valve can always pass on the pump pressure to the selection valve. When, however, the pump pressure fails, the higher pressure is supplied by the steering unit, so that now the pressure of the auxiliary pump reaches the operating inlet of the pilot valve, and, when the pilot valve is operated, the pressure of the auxiliary pump can change over the selection valve. This solution has the advantage that the driver does not have to consider the change-over. When the pressure of the pump fails, but the steering unit is operated, the pressure for changing over the selection valve is automatically available. When the fault is remedied and the pressure of the pump is available again, the return to the pump pressure takes place automatically.

The outlet of the steering unit has two directional lines, between which a second two-way valve is arranged, whose outlet is connected with the second inlet of the change-over valve. The pressure for changing over the selection valve is thus available, independently of the direction, in which the vehicle is steered. Also here, changing over to the directional line with the higher pressure takes place automatically, so that an intervention by the driver is not required.

The measuring motor section can be switched between two different displacements by means of a pressure controlled second change-over valve, the second change-over valve setting the smallest displacement in the pressureless state. In this connection the fact is taken into consideration that usually the steering motor arrangement, which acts upon the steered wheels, has a smaller fluid requirement than the second steering motor arrangement, which acts upon the converting kit. When the displacement of the steering unit is changed, it may be ensured that the driver of the vehicle feels no large differences, when steering the vehicle by means of the wheel steering or by means of the converting kit. When, however, in the case of a failure of the pump pressure, the measuring motor section is used as auxiliary pump, a large displacement means an equally large effort for the driver. When it is ensured that a failure of the pump pressure will automatically cause the setting of the smaller displacement, the driver will need less force for the emergency steering. The selection of the smaller displacement takes place automatically, so that the driver no longer has to take care of the change-over. In unusual situations, as for example emergencies, it can usually not be assumed that the driver considers all opportunities.

A sensor is arranged on the converting kit, which sensor is connected with a control device, which separates the operating inlet of the pilot valve from its outlet when the neutral position of the converting kit is reached. Here, it is assumed that in the case of an emergency the steering should mainly be made by means of the steered wheels. The second steering motor arrangement is thus only operated, until the vehicle is straightened again. This position is recognised by the sensor and reported to the control device. The control device may for example contain some electronics activating the pilot valve electrically. During failure of the pump pressure, the control device can then overrule a signal from the driver, who wants to operate the converting kit.

In the pressureless state the selection valve connects the first steering motor arrangement with the steering unit. In the case of an emergency, the wheel steering is the preferred mode of steering. This is then automatically selected. An operation of the selection valve is only required in the cases, in which the vehicle is not straight.

DESCRIPTION OF THE PREFERRED EMBODIMENT

Figure 1:
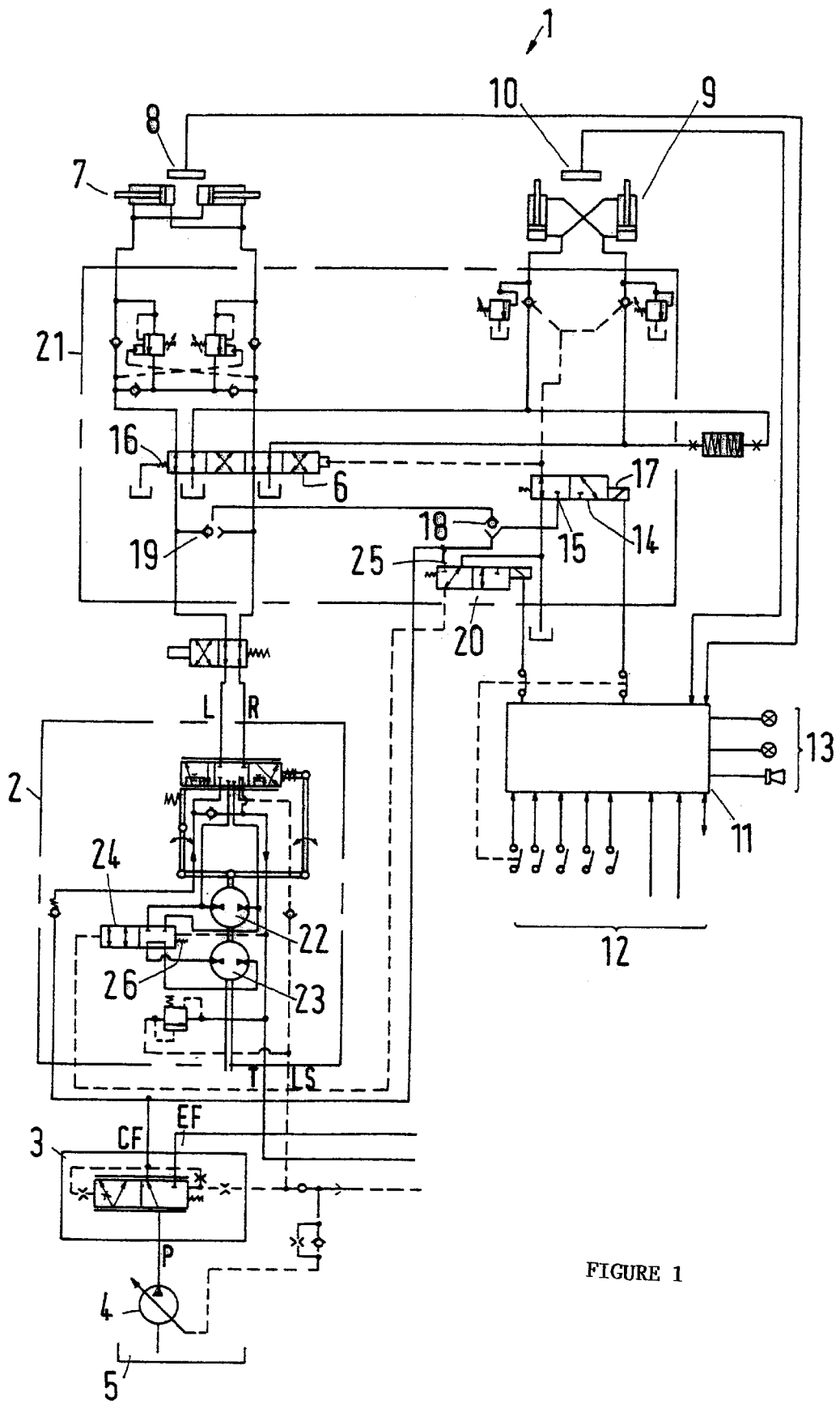
FIG. 1 is a schematic view of a hydraulic steering system of this invention.

A hydraulic steering system 1 has a steering unit 2, which is supplied with pressurised hydraulic fluid by a pump 4 via a priority valve 3, as known per se. The hydraulic fluid can, for example, be taken from a tank 5.

The steering unit 2 is connected with a selection valve 6, which, in one switching position, passes on hydraulic fluid from the steering unit 2 to a first steering motor arrangement 7, which acts upon steered wheels (not shown). The position of the steered wheels or the steering motor arrangement 7 can be determined via a first sensor 8. When the selection valve 6 is changed over, it passes on the hydraulic fluid from the steering unit 2 to a second steering motor arrangement 9, which acts upon a converting kit of the vehicle (not shown). The converting kit connects two parts or frames of a vehicle, which can be turned in relation to each other by means of the steering motor arrangement 9. A second sensor 10 determines the angle position of the two vehicle parts.

The two sensors 8, 10 are connected with a control device 11, which has a number of inlets 12 and several optical or acoustic displays 13.

The selection valve 6 can be adjusted by means of a pilot valve 14, which passes on a hydraulic pressure from its operating inlet 15 to a side of the selection valve 6, while the other side of the selection valve 6 is loaded by a return spring 16. With this embodiment it is assumed that the selection valve 6 is in the form of a slide valve. However, any valve can be used, which is hydraulically operable.

The pilot valve 14 itself is electrically operable, for example by means of a magnet 17, which is activated by the control device 11.

The operating inlet 15 of the pilot valve 14 is connected with the outlet of a two-way valve 18. The first inlet of the two-way valve 18 is connected with the pump 4, while the second inlet of the two-way valve 18 is connected with the outlet of a second two-way valve 19, whose two inlets are connected with the two direction outlets of the steering unit 2. The selection valve 6, the two two-way valves 18, 19, the pilot valve 15 and an additional pilot valve 20 are arranged in a valve block 21.

The steering unit 2 has a measuring motor section with two measuring motors 22, 23. A second change-over valve 24 is provided, either for short-circuiting the second measuring motor 23 (shown position) or for connecting it in parallel with the first measuring motor 22, in order to increase the displacement of the steering unit 2. The second pilot valve 20 activates the second change-over valve 24. For this purpose, the second pilot valve 20 has an operating inlet 25, which is also connected with the pump 4 via the priority valve 3.

The steering system works as follows: In the shown position of the selection valve 6, an operation of the steering unit 2 will cause an activation of the motors of the steering motor arrangement 7 and a movement of the steered wheels of the vehicle. Only the first measuring motor 22 is used. The steering unit 2 can be a steering unit of the type OSPD from Danfoss A/S, which is known per se, so that further details are not required.

When the driver wants to change to articulated steering, he gives an instruction via one of the inlets 12 of the control device 11, which causes that the two pilot valves 14, 20 are activated. Thus, firstly the selection valve 6 is changed over, so that the steering unit 2 now acts upon the second steering motor arrangement 9. At the same time, the second pilot valve 20 also changes over the second change-over valve 24, so that now the steering unit 2 works with a larger displacement. In this way, it is considered that the second steering motor arrangement 9 for the converting kit has a larger fluid consumption than the first steering motor arrangement 7 for the wheel steering. The driver can switch optionally between the two possibilities to utilise various steering opportunities.

When the pressure of the pump 4 fails, the selection valve 6 and the change-over valve 24 return to the positions shown in the figure. For this purpose, the change-over valve has a return spring 26. The first measuring motor 22 now acts as an auxiliary pump, can, however, only act upon the first steering motor arrangement 7 and steer the wheels. The second measuring motor 23 is short-circuited.

Assuming that the vehicle was still articulated when the failure occurred, the driver's possibilities of performing a decent steering are very limited. Thus, his first wish will be to straighten the vehicle. For this purpose, he operates the first pilot valve 14, which serves the activation of the selection valve 6. As, however, the pump pressure has failed, the selection valve 6 cannot immediately be displaced. To remedy this fault, the two two-way valves 18, 19 are provided.

The oil supplied by the measuring motor 22 now reaches one of the two working connections L, R. The two-way valve 19 passes on the higher of the two pressures to the two-way valve 18, which passes on the pressure of the measuring motor 22 to the operating inlet 15 of the pilot valve 14. When the pilot valve 14 is activated, the oil from the measuring motor 22 reaches the selection valve 6, and can displace the selection valve. The following oil quantity, which is supplied by the measuring motor 22, then reaches the second steering motor arrangement 9 via the selection valve with the purpose of straightening the vehicle.

When the vehicle has been straightened, this is recognised by the sensor 10, which passes the information on to the control device 11. The control device 11 can now be programmed so that in this case, it disconnects the pilot valve 14 again, so that the selection valve 6 is moved back to the position shown, in which the steering unit 2 is connected with the first steering motor arrangement 7. A further operation of the steering unit 2 then only causes a steering of the wheels.

It is therefore seen that this invention will achieve its stated objectives.

We claim:

1. A hydraulic steering system for a vehicle with two steering motor arrangements, particularly an articulated vehicle with wheel steering, with a hydraulic steering unit having a measuring motor section, with a selection valve, which connects an outlet of the steering unit with either a first steering motor arrangement or a second steering motor arrangement and which is hydraulically operable via a pilot valve, and with a pump, which is connected with the steering unit and the pilot valve, characterised in that an operating inlet (15) of the pilot valve (14) is connected with an outlet of a change-over valve (18), whose first inlet is connected with the pump (4) and whose second inlet is connected with the outlet (L, R) of the steering unit (2).

2. A steering system according to claim 1, characterised in that the change-over valve (18) is made as a two-way valve.

3. A steering system according to claim 1, characterised in that the outlet (L, R) of the steering unit has two directional lines, between which a second two-way valve (19) is arranged, whose outlet is connected with the second inlet of the change-over valve (18).

4. A steering system according to claim 1, characterised in that the measuring motor section can be switched between two different displacements by means of a pressure controlled second change-over valve (24), the second change-over valve (24) setting the smallest displacement in the pressureless state.

5. A steering system according to claim 1, characterised in that a sensor (10) is arranged on the converting kit, which sensor is connected with a control device (11) that separates the operating inlet (15) of the pilot valve (14) from its outlet when the neutral position of the converting kit is reached.

6. A steering system according to claim 1, characterised in that in the pressureless state the selection valve (6) connects the first steering motor arrangement (7) with the steering unit (2).

* * * * *